United States Patent Office 2,950,982
Patented Aug. 30, 1960

2,950,982
COATING COMPOSITIONS HAVING REDUCED ODOR ON DRYING

Alfred Berthold, Eastlake, and Oliver J. Grummitt, Cleveland, Ohio, assignors to The Sherwin-Williams Company, Cleveland, Ohio, a corporation of Ohio No Drawing. Filed Feb. 13, 1958, Ser. No. 714,944

5 Claims. (Cl. 106—263)

This invention relates as indicated to improved coating compositions in which the problem of odor in connection with drying has been specifically alleviated.

The odors of non-aqueous coating compositions, pigmented or not, containing as essential ingredients drying oils, semi-drying oils, or oil modified resins, e.g., drying oil or acid modified and semi-drying oil or acid modified alkyd resins, etc. are familiar to everyone. The odor of the paint in the can, during application, and during the first few hours that the film is on a surface is attributable to the volatile organic solvent. Usually these solvents are of the hydrocarbon type, e.g., mineral spirits, naphtha, xylol and the like. In recent years so-called odorless mineral spirits have been developed and these have given a very considerable improvement in odor during application and early drying.

However, the odor generated in the film by oxidative polymerization over a period of several days is not improved by the substitution of odorless mineral spirits for the conventional hydrocarbon solvents. "Drying paint" odor is presumably caused by the formation and escape of volatile organic compounds such as acids, aldehydes, etc. from the reaction of unsaturated oils and acids present as the oil, or as a modifier of a resin, e.g., alkyd or maleic-rosin, phenolic, etc.

It is a principal object of this invention, therefore, to provide non-aqueous coating compositions having reduced "drying paint" odor.

Another object of this invention is to provide a method for improving the odor on drying of coating compositions containing binders reactive with atmospheric oxygen.

Another object of this invention is to provide coating compositions of improved odor on drying, said coating compositions characterized in that they contain synthetic drying oil and/or semi-drying oil modified resins, e.g., alkyds, rosin-maleics, etc., which are reactive with atmospheric oxygen.

Another object of this invention is to provide a method for improving the odor on drying of coating compositions containing drying oils and/or semi-drying oils, or such oils as modifiers for paint resins reactive with atmospheric oxygen.

Other objects of this invention appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

It has been found that coating compositions formulated to contain a minor amount of certain sulphonic acid salts characterized by an alpha carbon atom substituent possess reduced odor from oxidative polymerization sources upon drying. Unlike the numerous additives already available, the substances of this invention are substantially odorless per se. They are not, therefore, substances of the perfume or reodorant or masking type. Control of odor is believed to be obtained in the present compositions by in situ chemical reaction in contradistinction to other methods of odor control in such compositions.

Broadly stated, therefore, this invention contemplates a non-aqueous coating composition which dries at least in part by oxidation containing from about 0.001% to about 5% by weight of a metal sulphonate having the following general formula:

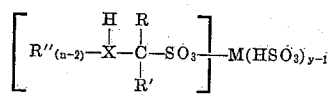

wherein R is selected from the group consisting of aliphatic radicles of at least 10 carbon atoms and aromatic radicles, R' is selected from the group consisting of hydrogen and methyl, R" is selected from the group consisting of aliphatic, aromatic and cycloaliphatic radicles, X is selected from the group consisting of oxygen and nitrogen, M is selected from the group consisting of alkali metals and alkaline earth metals, $n$ is the valence of X and $y$ is the valence of M.

One convenient method of producing the odor-controlling ingredients of the compositions of this invention is by the addition of an excess of a metal bisulphite to a non-odorous aldehyde, ketone, or Schiff's base.

The structure of the alpha substituted sulphonates useful in accordance with this invention may be represented by the following structural formulas, using the sodium salt as a typical example:

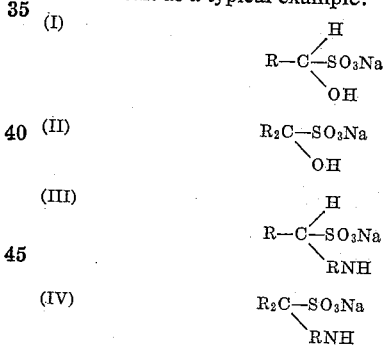

Compounds having formulas corresponding to I and II above are conveniently produced by the addition of sodium bisulphite, for example, to an aldehyde or a ketone of the non-odorous type. Compounds having formulas corresponding to III and IV above are conveniently produced by the addition of sodium bisulphite, for example, to the Schiff's base of an aldehyde or ketone.

The structure of such addition compounds is usually considered to be one in which a hydrogen atom of the bi-sulphite is attached to the carbonyl oxygen or imino nitrogen and the balance of the bi-sulphite radicle is attached to carbon. The bond between the carbon and sodium sulphite group is believed to be a carbon-sulphur bond, giving the structure corresponding to the sodium sulphonate.

The formulas above are typical for a monovalent metal such as sodium, potassium, and lithium, the alkali metals commercially available in the form of bisulphites. Where a bi-valent alkaline reacting metal bisulphite is used to fabricate the alpha substituted metal sulphonates useful in accordance with this invention, it is believed that only one valence bond of the metal is satisfied by the organic residue shown in Formulas I through IV above as being attached directly to sulphur. The other valence bond is believed to be satisfied by the bisulphite radicle (—OSO₂H).

The Formulas I through IV above may be generalized into a single structural formula as follows

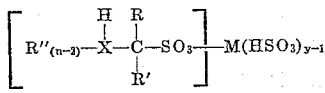

wherein R is selected from the group consisting of aliphatic radicles of at least 10 carbon atoms and aromatic radicles, R' is selected from the group consisting of hydrogen and methyl, R" is selected from the group consisting of aliphatic, aromatic and cyclo-aliphatic radicles, X is selected from the group consisting of oxygen and nitrogen, M is selected from the group consisting of alkali metals and alkaline earth metals, $n$ is the valence of X and $y$ is the valence of M.

Considering the individual radicles in the order named in the next preceding paragraph, R may be any aliphatic radicle containing 10 or more carbon atoms such as, for example, decyl, undecyl, dodecyl, tetradecyl, pentadecyl, hexadecyl, oleyl, stearyl, palmityl, cetyl, hydroxy stearyl, dichlorostearyl, and the like. The presence or absence of substituent groups such as halogen, hydroxyl, nitro, and the like on these aliphatic chains apparently has no influence upon the operability of these agents. The radicle R may also be aromatic or substituted aromatic, such as, for example, phenyl, naphthyl, methyl phenyl, benzyl, chlorophenyl, methoxy phenyl, xylyl, etc.

The radicle R' may be hydrogen or methyl. When R' is hydrogen, the compounds useful in accordance with this invention are conveniently produced from bi-sulphites and aldehydes. R' may also be methyl and in this case the useful compounds are conveniently produced from ketones and metal bisulphites.

R" may be any aliphatic, aromatic or cycloaliphatic radicle such as cyclobutyl, cyclopentyl, cyclohexyl, or the substituted radicles containing an inorganic substituent group such as hydroxyl, halogen, nitro, etc. Examples of aliphatic and aromatic radicles are given above with the exception that in this particular case the aliphatic radicle may contain from 1 to 10 or more carbon atoms, e.g., methyl, ethyl, isopropyl, butyl, hexyl, octyl, 2-ethylhexyl, decyl, etc., including those of 10 or more carbon atoms, examples of which are listed above for R.

While a wide variety of aliphatic, aromatic, and cycloaliphatic radicles, whether or not substituted, are indicated above as useful herein for R", the general nature of this organic portion of the molecule does not appear to influence to any marked degree the manner in which these materials function as odor improving agents. The critical factor in these compounds is the portion indicated by the incomplete formula:

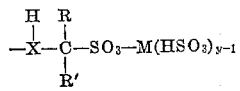

wherein the symbols have the significance above ascribed. So long as this configuration is present in the molecule of the additive, the chemical nature of the organic substituents, R", does not appear to affect the operability of the compound for the purposes of odor control.

The radicle X is oxygen or trivalent nitrogen. Of course, when X is oxygen the radicle R" does not appear since the available valences of oxygen are satisfied by the hydrogen and the alpha carbon atom. When X is nitrogen, the general formula corresponds to the addition compounds of the Schiff bases produced by the interaction of the primary amine with an aldehyde or ketone of the type useful in making the nitrogen-free bisulphite addition compounds above referred to.

M may be any alkali or alkaline earth metal such as sodium, potassium, lithium, calcium, barium, strontium, and magnesium. When M is divalent, then the radicle (—OSO₂H) very likely appears in the composition due to the fact that an excess of bisulphite is normally employed in making bisulphite addition compounds.

It becomes convenient at this point to illustrate the practice of this invention with specific examples which have been found to be representative and satisfactory modes of practicing the invention. It is to be understood that these examples are illustrative and in no way intended to limit the invention to the precise scope thereof.

*Example I*

Sodium bisulphite addition compounds of aldehydes and ketones may be prepared by the direct reaction of the organic compound, with or without a solvent, with a concentrated or saturated aqueous solution of the bisulphite. Thus, the reaction of equimolar quantities of undecanal (n-C₁₀H₂₁CHO) and sodium bisulphite gave the addition compound as an insoluble, pasty solid. This was filtered, washed with water and alcohol, and dried in air. By the same procedure stearaldehyde

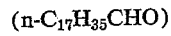

and sodium bisulphite were combined. These bisulphite addition compounds are only slightly soluble in mineral spirits, commonly used in alkyd resin type paints. To make certain that the paint or coating composition is saturated with the bisulphite addition compound, a very thorough mixing procedure is used. For example, a weighed quantity of the additive is added to the coating composition contained in an ordinary paint can together with a quantity of ⅛ inch stainless steel balls equal in volume to about ½ the total paint volume. The can is capped and then shaken vigorously on a paint mixing machine such as a "Red Devil" shaker. Such mixtures are saturated with respect to the additive and more nearly homogenous than those prepared by simply stirring the additive in the paint. A series of compositions are made from an ordinary coating composition containing a soy bean oil modified alkyl resin as the principal binder component which dries at least in part by oxidative polymerization by reaction with atmospheric oxygen. At concentrations of the additive ranging from 0.01 to 2%, odor tests were run in the manner described below. Both these additives caused a substantial reduction in the odor of the drying paint. The more effective additive was the stearaldehyde derivative. This may be accounted for by the fact that the stearaldehyde compound and stearaldehyde itself are less odorous than the corresponding undecanal compounds.

A series of odor tests were run with the stearaldehyde sodium bisulphite addition compound in which the concentration of the additive varied within the range of .01% to 5% based on the total weight of the coating composition. The 1% concentration appeared to be the most effective, affording the greatest reduction in paint drying odor. Further quantities while effective, did not appear to be necessary.

The comparison of odor is made by painting out samples on cardboard panels. The panel is placed in a "test can" and the odor of 2–5 panels of the same composition is evaluated by a group of 10 people. The observers are asked to rate the various samples in terms of relative odor—i.e., a range of number ratings from 1 to 5 for the least odor to the highest odor. The "test can" is a 1 gallon round paint container with ⅛ inch perforations around the outside about 1 inch from the bottom of the can and with a 3 inch hole cut in the lid of the can normally covered by a glass Petri dish. The cardboard panel, built as an inverted V, stands on the bottom of the can. The odor test is made by lifting the glass cover and sniffing.

*Example II*

The mechanism by which the alpha substituted sulphonates reduce paint odor is believed to involve the interchange or displacement reaction between the addition compound and volatile odorous aldehydes (aldehyde X) produced in the oxidative polymerization of the film. Thus, we may theoretically represent the situation as follows:

Stearaldehyde—NaHSO$_3$+aldehyde X⇌
Aldehyde X—NaHSO$_3$+stearaldehyde

Such reaction is believed to prevent the escape of volatile unpleasant smelling aldehydes of low molecular weight. The formation of the higher molecular weight aldehyde, e.g., stearaldehyde, is not detrimental because it is virtually odorless.

Some evidence of the practicability of this theory is demonstrated by two tests. When the group of persons examining the odor tested (A) mineral spirits, (B) mineral spirits+n-heptaldehyde, and (C) mineral spirits+n-heptaldehyde+stearaldehyde-sodium bisulphite, it was found that the odor of the heptaldehyde in sample (B) was considerably reduced by the presence of the bisulphite compound in sample (C).

In a second experiment an equimolar mixture of stearaldehyde-sodium bisulphite and n-heptaldehyde is allowed to stand at room temperature for several days in a sealed tube. The mixture was extracted with ether to remove soluble organic material from the aldehyde-sodium bisulphite addition compounds. After removing the ether from the extract, the refractive index (25°) of the remaining organic liquid was 1.4258 compared to 1.4104 for the original n-heptaldehyde. The increase in refractive index is believed to be due to the liberation of stearaldehyde.

*Example III*

The potassium bisulphite-stearaldehyde addition compound was made according to the procedure given in Example I. The product did not melt on heating but decomposed at 135–170° C.

*Example IV*

The addition compound of calcium bisulphite and stearaldehyde was prepared as follows:

10 grams of calcium carbonate were mixed with 100 ml. of water in a large test tube and sulphur dioxide bubbled through the mixture until no more solid dissolved. This saturated solution of calcium bisulphite was decanted from the remaining solid and combined with stearaldehyde according to Example I. The product decomposed above 150° C.

*Example V*

Magnesium bisulphite-stearaldehyde decomposing above 150° C. was similarly prepared from magnesium oxide.

*Example VI*

Lithium bisulphite-stearaldehyde decomposing above 150° C. was prepared in the same manner from the hydroxide.

When these metal bisulphite aldehyde addition compounds were tested, odor reduction was observed.

*Example VII*

Benzalaniline-sodium bisulphite was prepared by a procedure similar to that given in Example I and tested in soya alkyd paint in concentrations of 0.05%, 0.1%, 0.3% and 1% by weight. At concentrations up to 0.3% this addition agent reduced the odor level of the drying paint. At the higher concentrations, no particular improvement in the odor of the drying paint over that obtained with the 0.3% concentration was noted and the panel of testers began to detect the odor of the additive itself.

It was interesting to note that the addition of a mixture of 1% benzalaniline and 1% sodium bisulphite had no effect at all on reducing the odor level of the drying paint, showing that the addition compound is necessary to achieve this effect.

*Example VIII*

Following the same procedure as given in Example VII above, the sodium bisulphite addition compound of benzal-beta-naphthyl-amine was prepared and tested in a linseed oil modified alkyd paint at concentrations of 0.1% and 0.5%. It was likewise effective in reducing the odor level of the drying paint.

*Example IX*

The sodium bisulphite addition product of methyl stearyl ketone was prepared in the manner set forth in Example I. The addition compound was separated and vigorously stirred into a dehydrated castor oil modified alkyd varnish at concentrations ranging from 0.01% to 2%. Odor reduction was noted in all cases on comparison with the untreated varnish.

*Example X*

Two grams of the stearaldehyde-sodium bisulphite addition compound were ground in a mortar with 8 ml. of glycerol mono-oleate to a thick paste. This paste was then mixed by the steel ball technique with the paint in concentrations of 0.5, 1, 2, 3, 5, and 10%. At 2 and 3% concentrations (0.5 and 0.75% of stearaldehyde-sodium bisulphite) this mixture reduced the odor level during the third and fourth days of the test. The purpose of the glycerol mono-oleate was to solubilize the stearaldehyde-sodium bisulphite in the paint.

*Example XI*

0.3% by weight of the addition compound of Example III incorporated into boiled linseed oil clear varnish reduces the odor upon drying.

*Example XII*

0.3% by weight of the addition product of sodium bisulphite and stearaldehyde incorporated into soya maleic rosin ester clear varnish reduces the odor upon drying.

*Example XIII*

0.3% by weight of the addition product of sodium bisulphite and stearaldehyde incorporated into a varnish made by cooking soy bean oil and ester gum reduces the odor of said varnish upon drying.

*Example XIV*

0.2% by weight of the addition product of sodium bisulphite and stearaldehyde incorporated into a latex paint vehicle composed in part of butadiene styrene copolymer, and in part of linseed oil modified glyceryl phthalate alkyd reduces the odor normally encountered upon drying.

*Example XV*

0.3% by weight of the addition product of sodium bisulphite and stearaldehyde incorporated into a spar varnish made of tung oil cooked with phenol formaldehyde resin according to the usual practice reduces the odor of such composition normally encountered upon drying.

The wide variety of vehicles with which the additives of this invention appear to be operative indicates to us that those vehicles drying at least in part by oxidation and having as a part of or entirely the drying component, a fatty acid derivative whether as the naturally occurring oil, or said oil used as a modifier for some other resin, either chemically or in admixture, are improved by the inclusion therein of the additives hereinbefore described. It is apparently the unsaturated fatty acid radicle, regardless of its manner of incorporation in the vehicle, that causes odor upon drying by reaction with oxygen from the air. By improving such compositions as herein described, such odor is reduced.

This application is a continuation-in-part of our co-pending application Ser. No. 517,084, filed June 21, 1955, now abandoned.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A coating composition which contains as one of the essential film forming constituents a fatty acid derivative having an unsaturated fatty acid radicle, containing from about 0.001% to about 5% by weight of a metal sulphonate having the general formula:

$$\left[ HO - \underset{R'}{\overset{R}{\underset{|}{C}}} - SO_3 \right] - M(HSO_3)_{y-1}$$

wherein R is selected from the group consisting of monovalent aliphatic radicles of at least 10 carbon atoms and monovalent aromatic radicles, said radicle R being attached to C by a carbon-carbon linkage, R' is selected from the group consisting of hydrogen and methyl, M is selected from the group consisting of alkali metals and alkaline earth metals, and y is the valence of M.

2. A coating composition which contains as one of the essential film forming constituents a fatty acid derivative having an unsaturated fatty acid radicle, containing from about 0.001% to about 5% by weight of a metal salt of an aliphatic alpha hydroxy sulphonic acid containing at least 11 carbon atoms, said metal being selected from the group consisting of alkali and alkaline earth metals.

3. A coating composition which contains as one of the essential film forming constituents a fatty acid derivative having an unsaturated fatty acid radicle, containing from about 0.001% to about 5% by weight of the sodium salt of alpha hydroxy octadecane sulphonic acid.

4. A coating composition which contains as one of the essential film forming constituents a fatty acid derivative having an unsaturated fatty acid radicle, containing from about 0.001% to about 5% by weight of the potassium salt of alpha hydroxy octadecane sulphonic acid.

5. The method of reducing the odor in a coating composition which contains as one of the essential film forming constituents a fatty acid derivative having an unsaturated fatty acid radicle which comprises adding to said coating composition from about 0.001% to about 5% by weight of a metal sulphonate having the following general formula:

$$\left[ HO - \underset{R'}{\overset{R}{\underset{|}{C}}} - SO_3 \right] - M(HSO_3)_{y-1}$$

wherein R is selected from the group consisting of monovalent aliphatic radicles of at least 10 carbon atoms and monovalent aromatic radicles, said radicle R being attached to C by a carbon-carbon linkage, R' is selected from the group consisting of hydrogen and methyl, M is selected from the group consisting of alkali metals and alkaline earth metals, and y is the valence of M.

References Cited in the file of this patent

UNITED STATES PATENTS

| 2,170,308 | Holsten | Aug. 22, 1939 |
| 2,304,767 | Ross et al. | Dec. 8, 1942 |
| 2,418,451 | Auer | Apr. 8, 1947 |
| 2,583,602 | Schwab et al. | Jan. 29, 1952 |

OTHER REFERENCES

Mattiello: "Protective and Decorative Coatings," vol. I, pages 158 and 159 (1941).